(No Model.)
W. L. JUKES.
METHOD OF MANUFACTURING GLASS TUBING.
No. 321,369. Patented June 30, 1885.
Fig. 1.
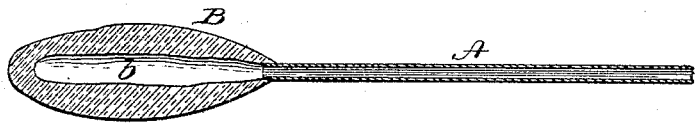
Fig. 2.
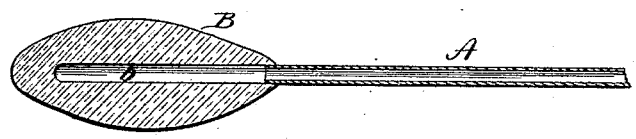
Fig. 3.
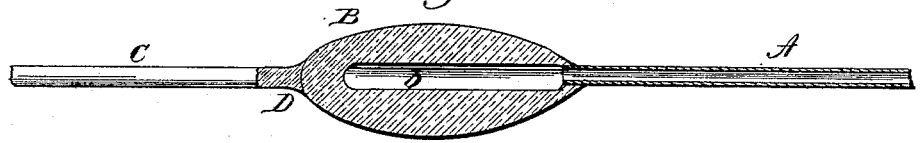
Fig. 4.      Fig. 5.
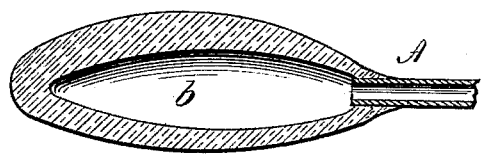 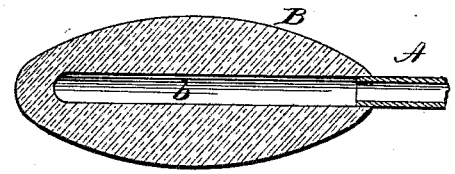
Fig. 6.
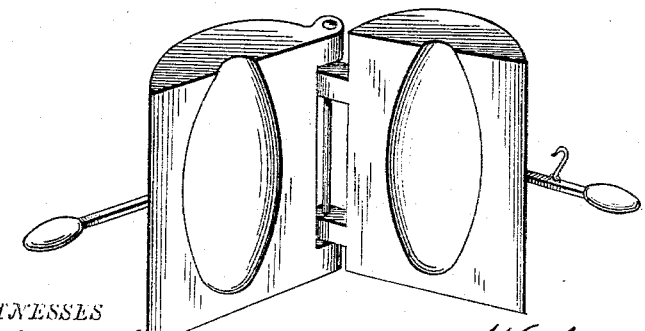
WITNESSES
F. L. Ouvaud
Arthur L. Morsell
INVENTOR,
Wesley L. Jukes,
By Louis Bagger & Co
Attorneys.

UNITED STATES PATENT OFFICE.

WESLEY L. JUKES, OF NEW YORK, N. Y.

METHOD OF MANUFACTURING GLASS TUBING.

SPECIFICATION forming part of Letters Patent No. 321,369, dated June 30, 1885.

Application filed May 8, 1885. (No model.)

*To all whom it may concern:*

Be it known that I, WESLEY L. JUKES, a citizen of the United States, and a resident of New York, in the county of New York and State of New York, have invented certain new and useful Improvements in Processes or Methods of Manufacturing Glass Tubing; and I do hereby declare that the following is a full, clear, and exact description of the invention, which will enable others skilled in the art to which it appertains to make and use the same, reference being had to the accompanying drawings, which form a part of this specification.

My invention has relation to an improved process or method of manufacturing drawn-glass tubing, and has for its object to reduce the time and labor in the manufacture of glass tubing, and also to produce a better article of manufacture than is possible by the method of manufacturing drawn-glass tubing as now practiced.

In order to fully understand the nature of my invention and the advantages which result therefrom, it is desirable to give a brief outline of the process as now practiced, in connection with which I would refer to the accompanying sheet of drawings, on which—

Figure 1 represents the "pipe" with a "ball" of glass at its end. Fig. 2 shows the pipe with its ball of glass after the same has been enlarged by the addition of more glass. Fig. 3 shows the ball ready for "drawing," with the pipe at one end and the "punty" or "post" at the opposite end. Fig. 4 is an enlarged section of the glass ball, as now made, in the process of manufacturing drawn glass tubing. Fig. 5 is a similar view of a pressed or molded ball, according to my improved method, showing the pipe attached to one end, ready for blowing; and Fig. 6 shows one of the molds employed in forming the ball shown in Fig. 5.

Similar letters of reference indicate corresponding parts in all the figures.

In manufacturing drawn-glass tubing by the method or process heretofore practiced a mass of glass is first placed upon the end of the hollow tube or pipe A. This mass of glass, which is technically called a "ball," is, after it has been "gathered" on the end of the pipe, manipulated on a "marver" or metal plate, so as to assume approximately the shape shown in Fig. 1, the ball being blown so as to have a hollow interior recess, as shown at $b$, the ball itself being designated by the letter B. After this ball is cooled sufficiently it is covered with a suitable quantity of glass, and is again manipulated on the marver, so as to assume a shape substantially as shown in Fig. 2, when the ball is ready for drawing. This is done by means of the rod or punty C, which is provided with a disk or lump of glass, D, technically called a "post," at its outer end, and this post is connected to the ball of glass at its free end, as shown in Fig. 3, after which the ball is "drawn" simply by drawing the punty and post away from it, and as the ball itself adheres to the post at one end and to the pipe at the other end the ball of glass will be drawn out into a tube of any suitable length.

The objection to this method of manufacture is that unless the ball of glass is of even thickness around its central recess the tube drawn from it will be of uneven thickness. It requires great skill to so manipulate the ball upon the marver as to prepare it for the drawing of a tube which shall be perfect—that is, of the same thickness throughout—and even the most skilled workmen often fail in making a ball which will draw a perfect tube.

By my improved process I do not form the ball by gathering the glass upon the end of the pipe and then manipulating the gathered ball on the marver; but I produce the ball by dropping a suitable quantity of molten glass into a form or mold of the shape which the ball is to have when it is ready for drawing, and by then forcing a plunger through the center of this molten mass of glass I produce a ball of the shape shown in Fig. 5, which is of absolute even thickness in all parts or all around its central recess, $b$, formed by the plunger. The difference between a ball produced by my method and one produced by the old method will be obvious on comparing Figs. 4 and 5 of the drawings, in which Fig. 4 represents a ball shaped by manipulation on the marver, while Fig. 5 shows a ball shaped in a form or mold and having its central recess formed with mathematical accuracy by a plunger.

Any suitable kind of form or mold adapted to the purpose may be used for shaping the ball in the manner described, and in Fig. 6 I have shown a hinged mold of the usual construction. After the mold has been closed and a lump of molten glass dropped into it from the top it is placed in a suitable press, and an iron rod or bar is forced vertically through the center of the molten mass, so as to form the recess $b$, the walls of which are of even thickness. It is then removed from the mold and attached to one end of the pipe by means of a post with a hole in its center, which is fastened upon the end of the pipe so as to form the connection. The ball is then blown and further manipulated in the usual manner, when it will produce perfect tubing of absolutely even thickness throughout its entire length.

Having thus described my invention, I claim and desire to secure by Letters Patent of the United States—

1. The improved process or method of manufacturing drawn-glass tubing herein described, which consists in forming the ball in a suitable form or mold provided with a plunger for forming the central recess in the ball, then attaching the ball by its open end to a pipe, and then blowing and drawing the ball in the usual manner, substantially as set forth.

2. As an improvement in the manufacture of drawn-glass tubing, the process or method of forming the hollow ball from which the tube is to be drawn by shaping the same in a suitable mold and then, after shaping, attaching it to the end of the pipe in contradistinction of gathering the ball upon the pipe, substantially as set forth.

In testimony that I claim the foregoing as my own I have hereunto affixed my signature in presence of two witnesses.

WESLEY L. JUKES.

Witnesses:
AUGUST PETERSON,
B. G. COWL.